United States Patent [19]

Princell

[11] Patent Number: 4,526,021
[45] Date of Patent: Jul. 2, 1985

[54] SPARE TIRE LOCK

[76] Inventor: William E. Princell, 10803 Wildwood Dr., Indianapolis, Ind. 46256

[21] Appl. No.: 519,140

[22] Filed: Aug. 1, 1983

[51] Int. Cl.³ ............................ G05G 5/00; E05B 65/12
[52] U.S. Cl. ............................................ 70/183; 70/259; 224/42.41; 224/42.06
[58] Field of Search ................. 70/259, 182, 183, 188; 224/42.06, 42.12, 42.21, 42.23, 42.25, 42.41; 414/463, 466

[56] References Cited

U.S. PATENT DOCUMENTS

| 3,865,264 | 2/1975 | Kuhns | 224/42.23 X |
| 4,031,726 | 6/1977 | De Jager | 70/259 X |
| 4,282,995 | 8/1981 | Austin | 70/259 X |

FOREIGN PATENT DOCUMENTS 902011  6/1972  Canada ........................ 224/42.23

Primary Examiner—Gary L. Smith
Assistant Examiner—Thomas J. Dubnicka
Attorney, Agent, or Firm—Barnes & Thornburg

[57] ABSTRACT

A locking mechanism is designed for a vehicle having a spare tire elevator mechanism, wherein the elevator mechanism includes a drive shaft, a gearbox, and a cable or the like for operatively coupling the gearbox to the tire to elevate it between storage and removal positions. The locking mechanism cooperates with a relatively stationary vehicle member such as a body panel or frame member adjacent the drive shaft. The locking mechanism includes a bracket providing a surface for non-rotatably engaging the drive shaft. A locking bracket is provided which is selectively engageable with the drive shaft engaging bracket. A lock having a shackle which passes through openings provided in both the bracket and the locking bracket prevents rotation of the bracket with respect to the locking bracket and thus with respect to the stationary vehicle member.

8 Claims, 5 Drawing Figures

4,526,021

SPARE TIRE LOCK

This invention relates to locking systems, and more specifically to spare tire locking systems for vehicles, such as pick-up trucks, which use elevator mechanisms to raise and lower spare tires into and out of their storage positions.

Generally, trucks have neither sufficient interior space nor lockable trunks in which a truck owner can store the truck's spare tire. As a result, most truck spare tires are stored exteriorly under the bed of the truck. This exterior storage makes the spare tire easily accessible to thieves. Since spare tires have no serial numbers or other identifying indicia on them when the truck comes from the factory, stolen spare tires are frequently difficult, if not impossible, to trace.

Recently, some truck manufacturers have begun using an elevator mechanism for raising and lowering the spare tire into and out of its storage position under the bed of the truck. For example, General Motors has begun using elevator mechanisms on their S-10 and S-15 pick-up trucks. The raising and lowering of the tire is usually accomplished through the rotation of a rotatable drive shaft which is operatively coupled to the spare tire through a gearbox. Although spare tire locks for vehicles having conventional spare tire storage facilities are known, these conventional spare tire locks are not readily adaptable for use on vehicles having elevator mechanisms.

It is an object of the instant invention to provide a locking mechanism for vehicles using elevator mechanisms to raise and lower their spare tires to reduce the likelihood of theft of the tires.

In accordance with the instant invention, in a vehicle spare tire elevator mechanism having a drive shaft, means for operatively coupling the drive shaft to the tire, and a relatively stationary vehicle member adjacent the drive shaft, a locking mechanism is provided for selectively preventing operation of the elevator mechanism. The locking mechanism comprises means for engaging the drive shaft, the drive shaft engaging means capable of orientation in locking relationship to the relatively stationary vehicle member to prevent operation of the elevator mechanism, and means for locking the drive shaft engaging means to the relatively stationary vehicle member to prevent operation of the elevator mechanism.

Illustratively, the drive shaft engaging means comprises a generally L-shaped bracket having a first portion for engaging the drive shaft and a second portion having means for attaching a locking bracket. The illustrative locking mechanism also includes a locking bracket having a first portion for receiving the drive shaft, a second portion for cooperation with the relatively stationary vehicle member, and a third portion for selective locking engagement with the L-shaped bracket.

One aspect of the instant invention is that a locking mechanism is provided which is easily installed on the vehicle and, when installed, is positioned to provide easy access to the locking mechanism for the user. The locking mechanism of the instant invention can be easily installed on the vehicle without the need for making modifications to the vehicle. Once installed, the locking mechanism is positioned to be easily operated to facilitate removal of the spare tire by the user.

Step bumpers are an option available on many trucks, and generally are not provided as standard equipment. Typically, step bumpers either are installed by the dealer when the truck is sold, or are installed by the user after the truck is purchased. The locking mechanism of the instant invention is adaptable to trucks with or without step bumpers. Because the same locking mechanism can be used on trucks with step bumpers and trucks without step bumpers, a single design locking mechanism can fit both types of bumpers. This characteristic reduces inventory costs to the supplier as the supplier need only keep one type of locking mechanism in his inventory. This characteristic also enables the owners of trucks without step bumpers to employ the same locking mechanism for their trucks should they later decide to purchase step bumpers.

Often, on trucks equipped with step bumpers, the step bumpers are positioned close to truck body panels. The close proximity of the truck body panels to the step bumper imposes spatial constraints upon the locking mechanism of the instant invention. Preferably, the locking mechanism is sized and shaped in view of these spatial constraints to permit the locking mechanism to be installed on trucks with and without step bumpers. For example, typically, the drive shaft which elevates the spare tire beneath the truck bed will have to be turned to a particular orientation, and portions of the locking mechanism will have to be turned generally horizontal to pass through the generally horizontal space between the top of the step bumper and the rear of the truck bed and tailgate. Such portions of the locking mechanism thus will have to be designed to take into account these constraints.

Various features and advantages of the invention will become apparent to those skilled in the art upon consideration of the following detailed description of embodiments of the invention. The detailed description particularly refers to the accompanying drawings in which.

Figure 1:
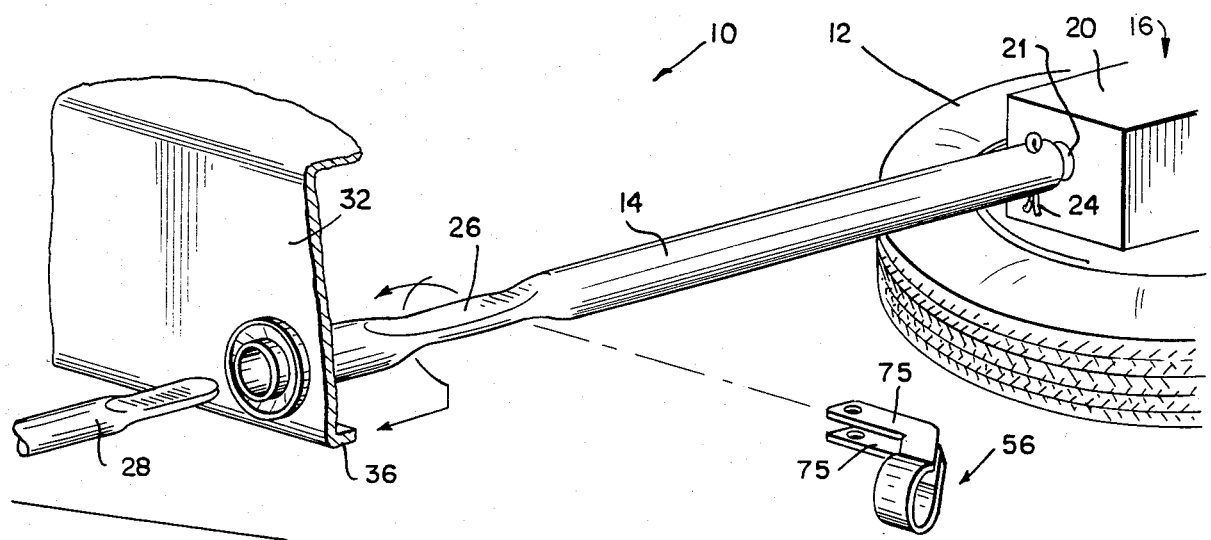
FIG. 1 is a partly fragmentary perspective view of a vehicle elevator mechanism showing the locking bracket disengaged from the drive shaft.

Referring now to FIGS. 1-4, a vehicle spare tire elevator mechanism 10 for elevating spare tire 12 between storage (illustrated) and access (not shown) positions includes a drive shaft 14 and a means 16 for operatively coupling the drive shaft 14 to the spare tire 12. The means 16 for operatively coupling the drive shaft 14 to the tire 12 typically includes a stranded steel cable (not shown) which is paid out and taken up through the operation of a gearbox 20 by rotation of the drive shaft 14. Gearbox 20 illustratively is of the type typically used on General Motors S-10 and S-15 pick-up trucks. Gearbox 20 includes a crank rod 21 to which drive shaft 14 is coupled by a cotter pin 24.

The illustrated drive shaft 14 is of the type known in the trade as a Fayette tube. It has a flattened area 26 which provides an interior cross section which can be engaged by the flattened end of a tire tool 28 for rotating drive shaft 14 to elevate spare tire 12 between its storage and access orientations through the action of gearbox 20.

A relatively stationary vehicle member, such as body panel 32, adjacent the drive shaft 14 includes an aperture (not shown) through which the distal end of drive shaft 14 extends. In vehicles such as General Motors S-10 and S-15 pick-up trucks, body panel 32 comprises a down-turned lip on the rearward end of a lower reinforcing truck bed support. As shown, body panel 32 extends generally transversely to the longitudinal extent of drive shaft 14, and includes a lower, horizontally disposed lip region 36.

A grommet 38 includes detentable pawl-type fingers 40 for holding the grommet 38 in the aperture in body panel 32. Grommet 38 provides the aperture through which the distal end of drive shaft 14 extends. Grommet 38 includes a smooth interior bearing surface in contact with which drive shaft 14 rotates in the aperture provided in grommet 38. Preferably, grommet 38 is made of a plastic material, such as nylon, and supports drive shaft 14. The aperture in grommet 38 is offset to hold the drive shaft 14 at the proper angle with respect to body panel member 32.

A locking mechanism 46 for selectively engaging shaft 14 to prevent operation of the elevator mechanism 16 includes a drive shaft engaging bracket 50, a locking bracket 56 for selectively engaging the bracket 50, and a lock 58 for locking the drive shaft engaging bracket 50 and locking bracket 56 in locked orientation.

Bracket 50 is somewhat L-shaped having a first leg portion 62 and a second leg portion 64. The first portion 62 is shaped for engagement within the interior of flattened region 26 of the drive shaft 14. This prevents relative rotation between the drive shaft 14 and bracket 50 when the portion 62 engages within the interior of region 26. The second portion 64 of bracket 50 includes an aperture 66. Illustratively, bracket 50 is formed from steel plate.

Often, on trucks equipped with step bumpers, the step bumpers are positioned close to body panel 32. The close proximity of the body panel 32 to the step bumper will impose spatial constraints upon the bracket 50. Preferably, the second portion 64 of bracket 50 is sized and shaped in view of these spatial constraints to permit the first portion 62 of the bracket 50 to be inserted into drive shaft 14 in trucks with and without step bumpers. For example, typically, the drive shaft 14 will have to be turned so that the flattened region 26 lies with its flat dimension generally horizontal, and bracket 50 will be turned generally horizontal to pass through the generally horizontal space between the top of the step bumper and the rear of the truck bed and tailgate. Second portion 64 will have to be sufficiently large to permit leverage to be exerted on it sufficient to rotate the drive shaft 14 to the orientation illustrated in FIG. 3 for reasons which will be explained.

Figure 3:
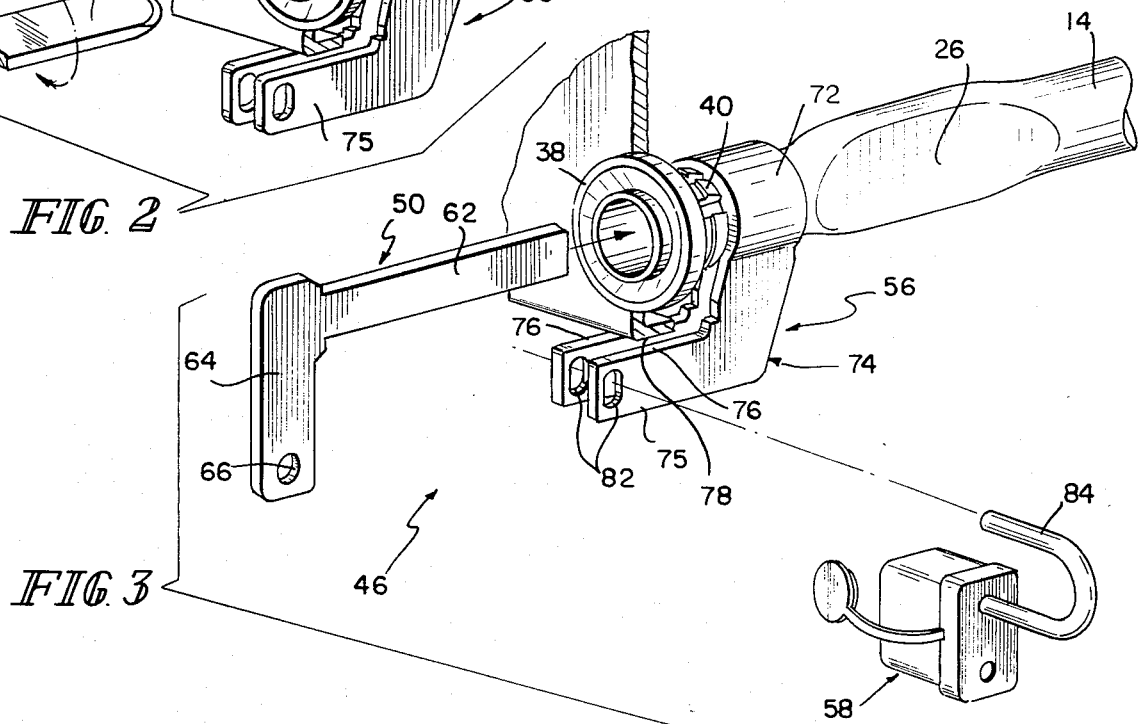
FIG. 3 is a partly fragmentary perspective view of the instant invention with the drive shaft engaging bracket and lock shown going into locking positions.

Locking bracket 56 includes a first, C-shaped portion 72 for receiving the circular cross-section regions of the drive shaft 14. Second portion 74 of bracket 56 comprises two legs 75 extending from the ends of the C-shaped portion 72. As best illustrated in FIGS. 1 and 3, bracket 56 engages drive shaft 14 by first sliding the two legs 75 around the drive shaft 14 in region 26 and then sliding bracket 56 rearward so that the C-shaped portion 72 of bracket 56 engages the drive shaft 14 between body panel member 32 and flattened area 26. Each leg 75 includes a surface 76 cooperable with the lower lip 36 of body panel 32 to prevent rotation of locking bracket 56 when the locking mechanism 46 is in its locked position, shown in FIG. 4. Each leg 75 further includes an aperture 82 provided near the distal end of each leg 75 of bracket 56. Apertures 82 are capable of alignment with aperture 66 in one orientation of the drive shaft 14, illustrated in FIGS. 3 and 4. To lock locking mechanism 46 in this orientation, the shackle 84 of lock 58 is placed through the aligned apertures 66, 82 of the bracket 50 and locking bracket 56, respectively, and lock 58 is locked.

When the locking mechanism 46 is locked, the bracket 50 and locking bracket 56 cooperate with body panel member 32 and drive shaft 14 to prevent rotation of drive shaft 14. Should one attempt to rotate drive shaft 14, the engagement of bracket 50 with region 26 of drive shaft 14 and locking bracket 56 rotates locking bracket 56. Locking bracket 56 is prevented from rotating very far in either direction by the engagement of surfaces 76 of the legs 75 of bracket 56 with the underside 78 of the lower lip 36 of body panel 32.

Figure 2:
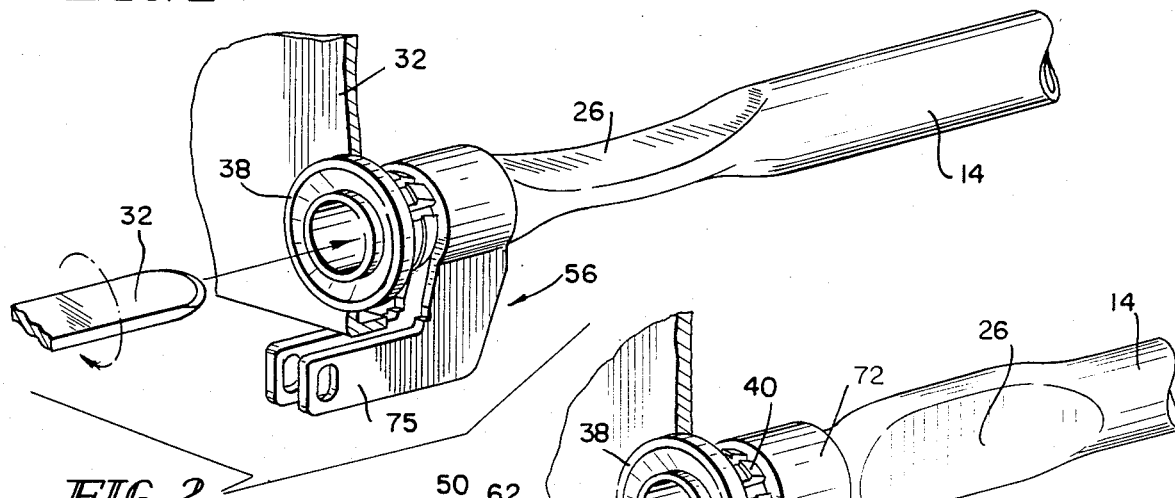
FIG. 2 is a partly fragmentary perspective view of a portion of the vehicle elevator mechanism showing the locking bracket of the instant invention in engaged position.
Figure 4:
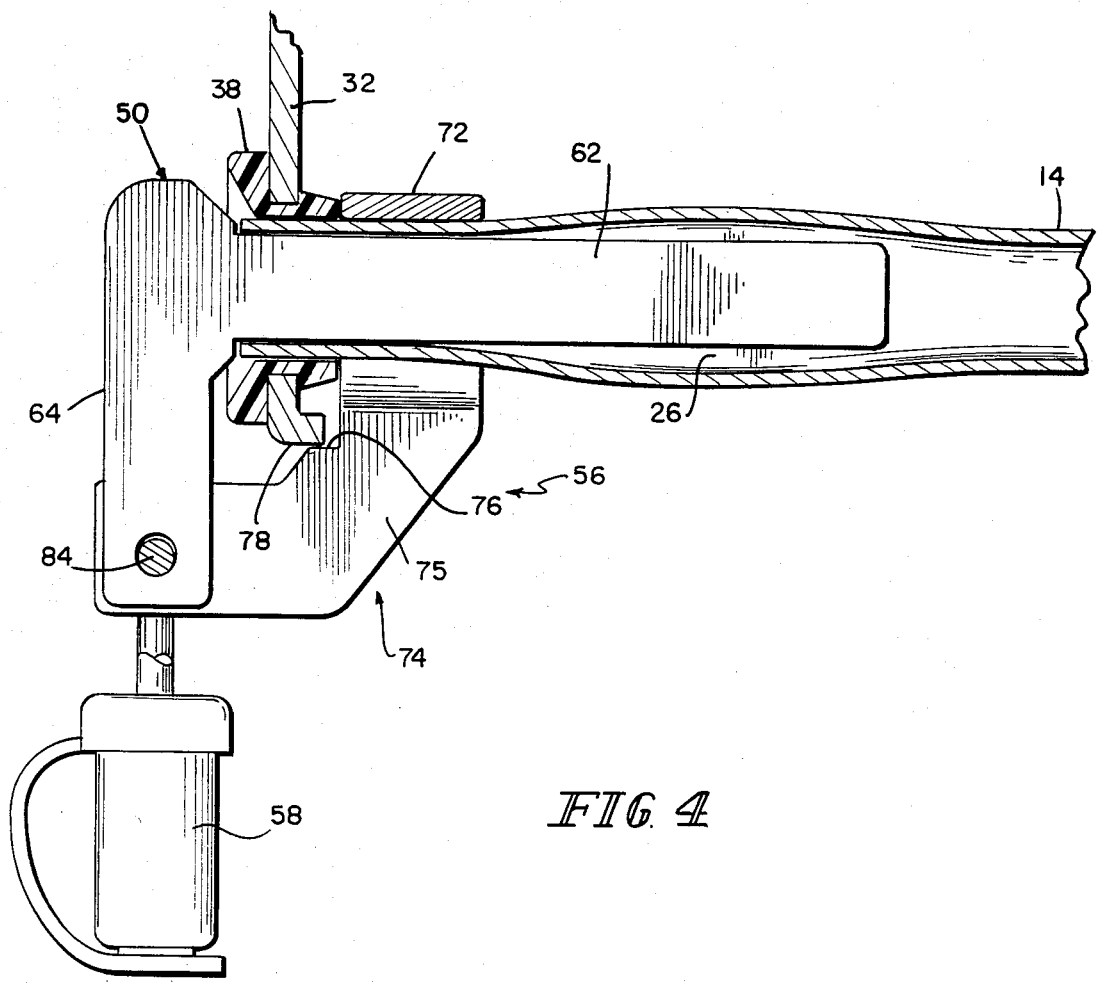
FIG. 4 is an enlarged sectional view, generally longitudinally of the drive shaft, showing the drive shaft in the locked position.

To install locking mechanism 46, the locking bracket 56 is slid over the flattened portion 26 of Fayette tube drive shaft 14. The C-shaped portion 72 of bracket 56 is then slid rearward on drive shaft 14 and rotated on the portion of drive shaft 14 between the flattened region 26 and body panel 32 into a position in which the legs 75 of the locking member 56 underlie the lower lip 78 of body panel 32, as shown in FIGS. 2-4. The first portion 62 of bracket 50 is then inserted into the open rearward end of drive shaft 14 to a position wherein the drive shaft engaging portion 62 of bracket 50 engages the interior of the flattened region 26 of drive shaft 14. Bracket 50 and drive shaft 14 are then rotated to a point at which the aperture 66 of bracket 50 aligns with the apertures 82 of locking bracket 56, as shown in FIGS. 3 and 4. Shackle 84 of lock 58 is then inserted through aperture 66 of bracket 50 and apertures 82 of locking bracket 56. After shackle 84 is so inserted, the lock 58 is then locked.

Figure 5:
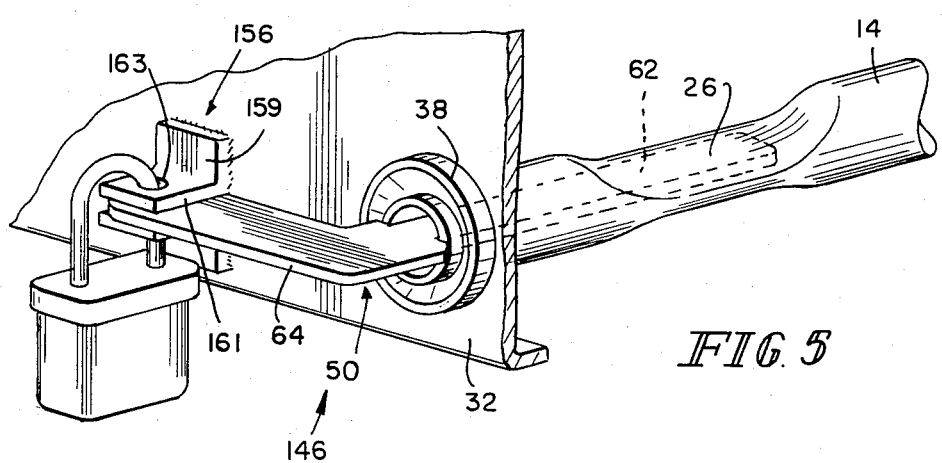
FIG. 5 is a perspective view of another embodiment of the invention.

Another embodiment of the locking mechanism is shown in FIG. 5. This locking mechanism 146 includes one or two locking brackets 156. Locking brackets 156 are generally L-shaped. Each locking bracket 156 has a first portion 159 attached to a body panel member 32 and a second portion 161 disposed generally perpendicular to body panel 32. Second portion 161 has an aperture 163. First portion 159 is attached to the body panel either by welding the first portion 159 to the body panel 32, as illustrated, or by providing apertures (not shown) in the first portion 159 and body panel member 132 using a screw fastener. If a screw fastener is used, preferably a type of screw fastener is used which resists removal from the body panel 32. Aperture 163 of second portion 161 is alignable with the aperture 66 (FIG. 3) of a bracket 50 to permit the shackle 84 of a lock 58 to be passed through apertures 163 and 66 to lock bracket 50 to brackets 156. Brackets 156 can also be formed by stamping one or more ears in body panel 32 and providing such ears with apertures alignable with aperture 66 of bracket 50. The ears can be stamped to be positioned on the body panel 32 in the same manner as the second portions 161 of brackets 156.

Although the invention has been described in detail with reference to certain embodiments and examples, variations and modifications exist within the scope and spirit of the invention as described and as defined in the following claims.

What is claimed is:

1. In a vehicle spare tire elevator mechanism having a hollow drive shaft, means for operatively coupling the drive shaft to the tire, and a relatively stationary vehicle member adjacent the drive shaft, a locking mechanism for selectively preventing operation of the elevator mechanism comprising a first bracket having a first portion for being removably received in the hollow drive shaft and being non-rotatable with respect to the drive shaft, and means for locking the first bracket to the relatively stationary vehicle member for preventing operation of the elevator mechanism.

2. The invention of claim 1 and further comprising a locking bracket, the first bracket further including a second portion having means engageable with the locking bracket and the locking means, the locking bracket including a first portion cooperable with the relatively stationary vehicle member for preventing operation of the elevator system when the first bracket is locked to the locking bracket.

3. The invention of claim 2 wherein the first bracket is generally L-shaped, the first portion of the first bracket comprising one leg of the L and the second portion of the first bracket comprising the other leg of the L.

4. The invention of claim 2 wherein the means on the second portion of the first bracket engageable with the locking bracket comprises means defining an aperture, and the locking bracket includes means defining an aperture, the aperture of the bracket and the aperture of the locking bracket in alignment for receiving a lock shackle.

5. The invention of claim 2 wherein the locking bracket further includes a second portion for engaging the drive shaft, and a third portion for selective locking engagement with the second portion of the first bracket.

6. In a vehicle spare tire elevator mechanism having a drive shaft, means for operatively coupling the drive shaft to the tire, and a relatively stationary vehicle member adjacent the drive shaft, a locking mechanism for selectively preventing operation of the elevator mechanism comprising means for engaging the drive shaft, the drive shaft engaging means capable of orientation in a locking relationship to the relatively stationary vehicle member to prevent operation of the elevator mechanism, means for locking the drive shaft engaging means to the relatively stationary vehicle member for preventing operation of the elevator mechanism, a locking bracket, the drive shaft engaging means comprising a bracket having a first portion for engaging the drive shaft and a second portion having means engageable with the locking bracket and the locking means, the locking bracket including a first portion for engaging the drive shaft, a second portion cooperable with the relatively stationary vehicle member, and a third portion for selective locking engagement with the drive shaft engaging means, the first portion of the locking bracket being somewhat C-shaped, the second portion comprising a leg attached to one end of said C-shaped portion, and the third portion comprising means defining an aperture cooperating with the bracket second portion for receiving said locking means.

7. In a vehicle spare tire elevator mechanism having a drive shaft, means for operatively coupling the drive shaft to the tire, and a relatively stationary vehicle member adjacent the drive shaft, a locking mechanism for selectively preventing operation of the elevator mechanism comprising means for engaging the drive shaft, the drive shaft engaging means capable of orientation in a locking relationship to the relatively stationary vehicle member to prevent operation of the elevator mechanism, and means for locking the drive shaft engaging means to the relatively stationary vehicle member for preventing operation of the elevator mechanism, the drive shaft comprising a Fayette tube and the drive shaft engaging means comprising a generally L-shaped bracket having a first leg for insertion into the Fayette tube and a second leg for cooperating with the relatively stationary vehicle member and engagement by the locking means to secure the Fayette tube against rotation.

8. In a vehicle spare tire elevator mechanism having a drive shaft, means for operatively coupling the drive shaft to the tire, and a relatively stationary vehicle member adjacent the drive shaft, a locking mechanism for selectively preventing operation of the elevator mechanism comprising means for engaging the drive shaft, the drive shaft engaging means capable of orientation in a locking relationship to the relatively stationary vehicle member to prevent operation of the elevator mechanism, and means for locking the drive shaft engaging means to the relatively stationary vehicle member for preventing operation of the elevator mechanism, the drive shaft comprising a Fayette tube and the drive shaft engaging means comprising a bracket having a first leg for insertion into the Fayette tube and a second leg for cooperating with the relatively stationary vehicle member and engagement by the locking means to secure the Fayette tube against rotation.

* * * * *